US011343683B2

(12) United States Patent
Jat et al.

(10) Patent No.: US 11,343,683 B2
(45) Date of Patent: May 24, 2022

(54) IDENTIFICATION AND PRIORITIZATION OF OPTIMUM CAPACITY SOLUTIONS IN A TELECOMMUNICATIONS NETWORK

(71) Applicant: T-Mobile USA, Inc., Bellevue, WA (US)

(72) Inventors: Khrum Kashan Jat, Sammamish, WA (US); Jatinder Sandhu, Bellevue, WA (US); Spoorthy Kondapally, Issaquah, WA (US); Jessica Sacks, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 212 days.

(21) Appl. No.: 16/855,991

(22) Filed: Apr. 22, 2020

(65) Prior Publication Data
US 2021/0337400 A1    Oct. 28, 2021

(51) Int. Cl.
*H04W 24/02*    (2009.01)
*H04W 16/18*    (2009.01)
*H04W 24/08*    (2009.01)

(52) U.S. Cl.
CPC .......... *H04W 24/02* (2013.01); *H04W 16/18* (2013.01); *H04W 24/08* (2013.01)

(58) Field of Classification Search
CPC ..... H04W 24/02; H04W 24/08; H04W 16/18; H04W 16/22
See application file for complete search history.

(56) References Cited

U.S. PATENT DOCUMENTS

| | | |
|---|---|---|
| 6,262,980 B1 | 7/2001 | Leung et al. |
| 6,526,010 B1 | 2/2003 | Morioka et al. |
| 6,891,694 B2 | 5/2005 | Hetzler et al. |
| 6,973,312 B1 | 12/2005 | Ngan et al. |
| 7,038,993 B2 | 5/2006 | Minamino et al. |
| 7,142,874 B1 | 11/2006 | Oleniczak |
| 7,343,375 B1 | 3/2008 | Dulac |
| 7,539,111 B2 | 5/2009 | Ishida et al. |

(Continued)

FOREIGN PATENT DOCUMENTS

| | | |
|---|---|---|
| KR | 20120089467 A | 8/2012 |
| KR | 20150021561 A | 3/2015 |
| KR | 20170076700 A | 7/2017 |

OTHER PUBLICATIONS

Ahas, R. et al. "Mobile Positioning in Space-Time Behaviour Studies: Social Positioning Method Experiments in Estonia" Cartography and Geographic Information Science vol. 34, No. 4, 2007, p. 259-273.

(Continued)

*Primary Examiner* — Hassan Kizou
*Assistant Examiner* — Hector Reyes
(74) *Attorney, Agent, or Firm* — Perkins Coie LLP

(57) ABSTRACT

Systems and methods that use historical data comprising capacity gain solutions and their associated gains at various locations to train a machine learning model. The trained machine learning model, upon receiving a new location (e.g., latitude and longitude coordinates), recommends the top n (e.g., the top 3) solutions that should be deployed at the new location to improve telecommunications network performance. The machine learning model uses clustering techniques to perform the recommendations.

14 Claims, 14 Drawing Sheets

(56) References Cited

U.S. PATENT DOCUMENTS

| | | |
|---|---|---|
| 7,539,919 B2 | 5/2009 | Hwang et al. |
| 7,680,495 B2 | 3/2010 | Abed et al. |
| 7,710,841 B2 | 5/2010 | Hwang et al. |
| 7,739,578 B2 | 6/2010 | Hwang et al. |
| 7,813,952 B2 | 10/2010 | Eskandari |
| 7,823,042 B2 | 10/2010 | Hwang et al. |
| 7,849,027 B2 | 12/2010 | Koran et al. |
| 7,898,921 B2 | 3/2011 | Ishida et al. |
| 7,929,459 B2 | 4/2011 | Silva et al. |
| 7,941,148 B2 | 5/2011 | Roskowski et al. |
| 7,945,837 B2 | 5/2011 | Hwang et al. |
| 7,957,993 B2 | 6/2011 | Macgregor |
| 7,966,233 B1 | 6/2011 | Khowash et al. |
| 7,987,122 B2 | 7/2011 | Bevente et al. |
| 8,060,079 B1 | 11/2011 | Goyal et al. |
| 8,060,602 B2 | 11/2011 | Singh et al. |
| 8,073,119 B2 | 12/2011 | Bevente et al. |
| 8,199,901 B2 | 6/2012 | Rani et al. |
| 8,270,979 B1 | 9/2012 | Vargantwar |
| 8,332,256 B2 | 12/2012 | Dey et al. |
| 8,429,270 B2 | 4/2013 | Singh et al. |
| 8,522,108 B2 | 8/2013 | Hwang et al. |
| 8,526,320 B2 | 9/2013 | Puthenpura et al. |
| 8,538,379 B1 | 9/2013 | Jessen et al. |
| 8,572,464 B2 | 10/2013 | Hwang et al. |
| 8,665,835 B2 | 3/2014 | Hussein et al. |
| 8,676,799 B1 | 3/2014 | Vaver |
| 8,694,018 B2 | 4/2014 | Budic et al. |
| 8,782,045 B1 | 7/2014 | Vaver |
| 8,782,216 B2 | 7/2014 | Raghavendran et al. |
| 8,861,691 B1 | 10/2014 | De et al. |
| 8,891,746 B2 | 11/2014 | Stachiw et al. |
| 8,914,372 B2 | 12/2014 | Cao et al. |
| 8,918,108 B2 | 12/2014 | Arad et al. |
| 8,918,397 B2 | 12/2014 | Cao et al. |
| 8,954,791 B2 | 2/2015 | Kataria et al. |
| 8,966,055 B2 | 2/2015 | Mittal et al. |
| 9,031,561 B2 | 5/2015 | Nuss et al. |
| 9,047,226 B2 | 6/2015 | Thomas et al. |
| 9,113,365 B2 | 8/2015 | Tang et al. |
| 9,154,550 B1 | 10/2015 | Abgrall et al. |
| 9,204,319 B2 | 12/2015 | Ouyang et al. |
| 9,226,178 B2 | 12/2015 | Tarraf et al. |
| 9,253,334 B1 | 2/2016 | Rai et al. |
| 9,264,932 B2 | 2/2016 | Chen et al. |
| 9,332,458 B2* | 5/2016 | Nuss ................. H04W 28/0247 |
| 9,411,653 B2 | 8/2016 | Trammel et al. |
| 9,413,890 B2 | 8/2016 | Mccormack et al. |
| 9,424,121 B2 | 8/2016 | Kushnir et al. |
| 9,430,944 B2 | 8/2016 | Grimm et al. |
| 9,437,081 B2* | 9/2016 | Hoffman ............. G07F 17/3267 |
| 9,439,081 B1 | 9/2016 | Knebl et al. |
| 9,456,362 B2* | 9/2016 | Flanagan ............. H04W 4/029 |
| 9,479,981 B2 | 10/2016 | Dimou et al. |
| 9,491,285 B2 | 11/2016 | Vaderna et al. |
| 9,503,919 B2 | 11/2016 | Sofuoglu et al. |
| 9,563,491 B2 | 2/2017 | Scouller et al. |
| 9,628,363 B2 | 4/2017 | Singh et al. |
| 9,674,374 B1 | 6/2017 | Bolton et al. |
| 9,706,438 B1 | 7/2017 | Kadmon et al. |
| 9,712,295 B2 | 7/2017 | Park et al. |
| 9,753,477 B2 | 9/2017 | Berka et al. |
| 9,826,412 B2 | 11/2017 | Henderson et al. |
| 9,826,420 B2 | 11/2017 | Tarraf et al. |
| 9,867,080 B2 | 1/2018 | Sung et al. |
| 9,892,026 B2 | 2/2018 | Isman et al. |
| 9,894,215 B1 | 2/2018 | Bolton et al. |
| 9,924,045 B1 | 3/2018 | Guha et al. |
| 10,039,013 B2 | 7/2018 | Periyasamy et al. |
| 10,044,878 B2 | 8/2018 | Guha et al. |
| 10,050,844 B2 | 8/2018 | Flanagan et al. |
| 10,079,735 B2 | 9/2018 | Martone et al. |
| 10,091,679 B1 | 10/2018 | Munar et al. |
| 10,159,111 B2* | 12/2018 | De Pasquale ........ H04W 64/006 |
| 10,231,147 B2 | 3/2019 | Sung et al. |
| 10,555,191 B1 | 2/2020 | Jat et al. |
| 11,064,382 B1 | 7/2021 | Jat |
| 2003/0171976 A1 | 9/2003 | Farnes et al. |
| 2006/0064346 A1 | 3/2006 | Steenstra et al. |
| 2006/0167777 A1 | 7/2006 | Shkedy |
| 2007/0156673 A1 | 7/2007 | Maga et al. |
| 2010/0041408 A1 | 2/2010 | Caire et al. |
| 2012/0190380 A1 | 7/2012 | Dupray et al. |
| 2012/0244869 A1* | 9/2012 | Song ................. H04W 52/0206 455/449 |
| 2012/0244898 A1 | 9/2012 | Guey et al. |
| 2013/0095872 A1 | 4/2013 | Sediq et al. |
| 2013/0229914 A1 | 9/2013 | Suerbaum |
| 2013/0331109 A1* | 12/2013 | Dhillon ................. H04W 24/02 455/446 |
| 2014/0278035 A1 | 9/2014 | Nortrup |
| 2016/0125456 A1 | 5/2016 | Wu et al. |
| 2016/0381580 A1 | 12/2016 | Kwan |
| 2017/0243484 A1 | 8/2017 | Li et al. |
| 2017/0272319 A1 | 9/2017 | Sheen et al. |
| 2018/0006957 A1 | 1/2018 | Ouyang et al. |
| 2018/0184307 A1* | 6/2018 | Periyasamy .......... H04M 15/62 |
| 2019/0141580 A1 | 5/2019 | Oktay et al. |
| 2019/0159048 A1* | 5/2019 | Feldkamp ............... H04L 43/08 |
| 2019/0208438 A1 | 7/2019 | Yang et al. |
| 2019/0239238 A1* | 8/2019 | Calabrese ............. H04W 72/04 |
| 2020/0076520 A1 | 3/2020 | Jana et al. |
| 2020/0314683 A1 | 10/2020 | Imran et al. |
| 2020/0322814 A1* | 10/2020 | Tofighbakhsh ....... H04W 24/02 |
| 2021/0014698 A1* | 1/2021 | Meier-Hellstern .... H04W 16/22 |
| 2021/0037394 A1* | 2/2021 | Wainer ................... G06N 20/00 |
| 2021/0037399 A1 | 2/2021 | Jat et al. |
| 2021/0049656 A1 | 2/2021 | Jat et al. |

OTHER PUBLICATIONS

Bi, Suzhi et al. "Engineering Radio Maps for Wireless Resource Management" IEEE Wireless Communications, Apr. 2019, p. 133-141.

De Reuver, M. et al. "Designing viable business models for context-aware mobile services" Elsevier Telematics and Informatics 26 (2009) p. 240-248.

Lee, Seung-Cheol et al. "Efficient Mining of User Behaviors by Temporal Mobile Access Patterns" International Journal Computer Science and Network Security, vol. 7, No. 2, Feb. 2007, p. 285-291.

Ratti, C. et al. "Mobile Landscapes: using location data from cell phones for urban analysis" Environment and Planning B: Planning and Design 2006, vol. 33, p. 727-748.

Roth, John D. et al. "Efficient System Geolocation Architecture in Next-Generation Cellular Networks" IEEE Systems Journal, vol. 12, No. 4, Dec. 2018, p. 3414-3425.

Tseng, V. S. et al. "Mining Temporal Mobile Sequential Patterns in Location-Based Service Environments" IEEE International Conference 2007, 8 pages.

European Patent Office, Extended European Search Report, EP Patent Application 21172462, dated Sep. 23, 2021, 13 pages.

Kuruvatti, Nandish P. et al. "Monitoring Vehicular User Mobility to Predict Traffic Status and Manage Radio Resources," 2017 IEEE 85th Vehicular Technology Conference (VTC Spring), IEEE, Jun. 4, 2017, 6 pages.

Shabir, Balawal et al. "Congestion Avoidance in Vehicular Networks: A Contemporary Survey," IEEE Access vol. 7, Nov. 27, 2019, 20 pages.

* cited by examiner

| Report Date | Vendor | Region | Market | Sector | TARGET SECTOR | Solution | On-Air Date |
|---|---|---|---|---|---|---|---|
| 3/6/2019 | ERICSSON | NORTHEAST | Philadelphia | 1AT1063A2 | 1AT1063A1 | L1900 | 12/4/2016 |
| 3/6/2019 | ERICSSON | NORTHEAST | Philadelphia | 1AT1063A2 | 1AT1063A1 | L1900 | 12/4/2016 |

Post Solution Deployment-14 days after

| Bandwidth (MHz) | Total Traffic (MB) | AVG Traffic (MB) | Users / 5 MHz | DL PRB Util (%) | CQI | QCI6 Thrpt (Kbps) | QCI7 Thrpt (Kbps) | NonGBR Thrpt (Kbps) | AVG VoLTE Calls (#) | Total VoLTE Calls (#) |
|---|---|---|---|---|---|---|---|---|---|---|
| 20.0 | 58,935.8 | 3,929.1 | 11.3 | 25.2 | 8.6 | 13,343.8 | 10,894.3 | 12,561.0 | 169.0 | 2,535.0 |
| 20.0 | 61,873.8 | 4,124.9 | 15.2 | 27.2 | 8.7 | 12,276.9 | 11,900.6 | 12,091.1 | 174.6 | 2,619.0 |

Pre Solution Deployment-14 days before

| Bandwidth (MHz) | Total Traffic (MB) | AVG Traffic (MB) | Users / 5 MHz | DL PRB Util (%) | CQI | QCI6 Thrpt (Kbps) | QCI7 Thrpt (Kbps) | NonGBR Thrpt (Kbps) | AVG VoLTE Calls (#) | Total VoLTE Calls (#) |
|---|---|---|---|---|---|---|---|---|---|---|
| 20 | 58,397 | 3,893.1 | 12.7 | 26.7 | 8.6 | 13,215.2 | 10,806.6 | 12,464.5 | 180.4 | 2,706.0 |
| 20 | 61,833 | 4,122.2 | 15.2 | 26.9 | 8.6 | 12,604.7 | 12,364.8 | 12,421.8 | 190.3 | 2,854.0 |

Gains

| Bandwidth (MHz) | Total Traffic (MB) | AVG Traffic (MB) | Users / 5 MHz | DL PRB Util (%) | CQI | QCI6 Thrpt (Kbps) | QCI7 Thrpt (Kbps) | NonGBR Thrpt (Kbps) | AVG VoLTE Calls (#) | Total VoLTE Calls (#) |
|---|---|---|---|---|---|---|---|---|---|---|
| 0.0% | 0.9% | 0.9% | -11.0% | -5.6% | 0.0% | 1.0% | 0.8% | 0.8% | -6.3% | -6.3% |
| 0.0% | 0.1% | 0.1% | 0.9% | 1.1% | 0.5% | -2.6% | -3.8% | -2.7% | -8.2% | -8.2% |

*FIG. 3A*

| SOLUTION | ON AIR DATE | SECTOR | TARGET SECTOR | CHANNEL BW |
|---|---|---|---|---|
| Overlay | 1/8/2019 | B4DE3252A21 | L4DE3252A21 | 20 |

| Pre solution deployment | | | | | | Post solution deployment | | | | | |
|---|---|---|---|---|---|---|---|---|---|---|---|
| TRAFFIC GB | Users / 5Mhz | DL PRB % | CQI | Thpt TMO Mbps | Thpt M-PCS Mbps | TRAFFIC GB | Users / 5Mhz | DL PRB % | CQI | Thpt TMO Mbps | Thpt M-PCS Mbps |
| 1.2 | 17 | 84 | 10 | 27 | 14 | 0.8 | 10 | 61 | 12 | 34 | 18 |

Offload Index

Capacity Gain

| SOLUTION | ON AIR DATE | MARKET | SECTOR | TARGET SECTOR | CHANNEL BW |
|---|---|---|---|---|---|
| SMALL CELL | 2/28/2017 | Los Angeles | LA0046BA6 | LA03051D1 | 20 |

| Pre solution deployment | | | | | | Post solution deployment | | | | | |
|---|---|---|---|---|---|---|---|---|---|---|---|
| TRAFFIC GB | Users / 5Mhz | DL PRB % | CQI | Thpt TMO Mbps | Thpt M-PCS Mbps | TRAFFIC GB | Users / 5Mhz | DL PRB % | CQI | Thpt TMO Mbps | Thpt M-PCS Mbps |
| 1.4 | 23 | 84 | 8.35 | 3.7 | 1.6 | 1.2 | 16 | 61 | 9.22 | 7.8 | 5.1 |

Offload Index 8.49

Capacity Gain

70%

| Per Month | Score Range | Ranges of Values (National 6 Months Data) | Equivalent Score | Weight | Weighted Score | Weights both Sections | Final Weighted Score | Site Final Score Publish |
|---|---|---|---|---|---|---|---|---|
| a | a | c (Equal buckesk 10th percentile to get equivalues score) | d | e | f | g | h | 42 |
| Revenue per Month | 1-100 | 0 – 500K | 57 | 0.3 | 17.1 | 75% | 33 | |
| Traffic | 1-100 | 0 – 1 TB | 27 | 0.2 | 5.4 | | | |
| Unique Users | 1-100 | 0 – 40K | 40 | 0.2 | 8 | | | |
| Count Supper Phones | 1-100 | 0 – 10K | 90 | 0.1 | 9 | | | 42 |
| Throughputs | 1-100 | 0 – 600 Mbps | 45 | 0.1 | 4.5 | | | |
| Hours of Congestion | 1-100 | 0 – 24 Mbps | 3 | 0.1 | 0.3 | | | |
| | Score Range | c (Equal buckesk 10th percentile to get equivalues score) | | | | | | |
| One Time | | | | | | | | |
| Cost of Lease | 1-100 | 0 – 100K | 40 | 0.3 | 12 | 25% | 9 | |
| Median Income | 1-100 | 0 – 140K | 32 | 0.1 | 3.2 | | | |
| Average House Price | 1-100 | 0 – 1.4M | 88 | 0.1 | 8.8 | | | |
| Cost of HW Installed | 1-100 | 0 – 200K | 10 | 0.2 | 2 | | | |
| % of 25-55% Yers Old | 1-100 | 0 – 100% | 35 | 0.3 | 10.5 | | | |

*FIG. 4A*

| Cluster Id | Gain | Lead Time | Best Sol |
|---|---|---|---|
| 3 | 20.969 | 4 | SecAdd |
| 1 | 19.252 | 7 | SecAdd |
| 6 | 17.569 | 8 | CellSplit |
| 4 | 16.303 | 12 | SmallCell |
| 5 | 15.952 | 9 | SecAdd |
| 2 | 14.072 | 13 | SecAdd |

*FIG. 6B*

IDENTIFICATION AND PRIORITIZATION OF OPTIMUM CAPACITY SOLUTIONS IN A TELECOMMUNICATIONS NETWORK

BACKGROUND

A telecommunications network is established via a complex arrangement and configuration of many cell sites that are deployed across a geographical area. For example, there can be different types of cell sites (e.g., macro cells, microcells, and so on) positioned in a specific geographical location, such as a city, neighborhood, and so on). These cell sites strive to provide adequate, reliable coverage for mobile devices (e.g., smart phones, tablets, and so on) via different frequency bands and radio networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. The devices can seek access to the telecommunications network for various services provided by the network, such as services that facilitate the transmission of data over the network and/or provide content to the devices.

As device usage continues to rise at an impressive rate, there are too many people using too many network (and/or data)-hungry applications in places where the wireless edge of the telecommunications network has limited or no capacity. As a result, most telecommunications networks have to contend with issues of network congestion. Network congestion is the reduced quality of service that occurs when a network node carries more data than it can handle. Typical effects include queueing delay, packet loss or the blocking of new connections, overall resulting in degraded customer experience. brief description of the drawings.

When performance of a cell site in a telecommunications network degrades below a threshold value (for example, an LTE site gets congested), different solutions have been suggested to address and resolve the degradation issues. However, it is difficult for wireless telecommunication service providers to determine which solution would be effective, optimal and cost-effective for the degraded site.

BRIEF DESCRIPTION OF THE DRAWINGS

FIGS. 3A-3F are example of data accessed/received/collected by the historical data module.

FIGS. 4A-4B illustrate scores generated for various sites in a geographic area.

FIGS. 6A-6B illustrate examples of generating clusters for a set of network improvement solutions records associated with a geographic area.

Figure 1:
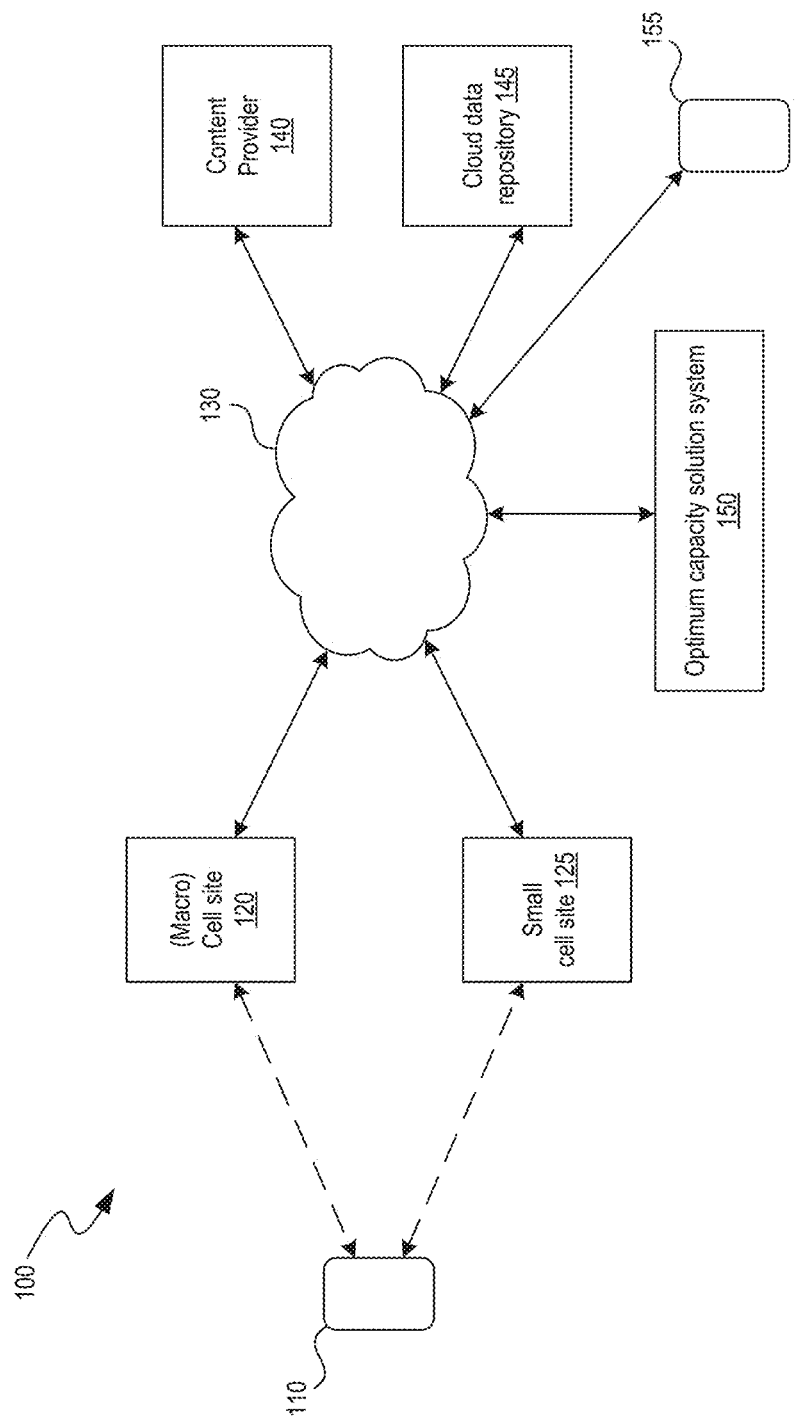
FIG. 1 is a block diagram illustrating a suitable computing environment within which to identify optimum network performance improvement solutions within a telecommunications network.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

An aim of a telecommunications service provider is to minimize customer experience degradation. This is typically achieved by deploying congestion management and/or network improvement solutions at one or more cell sites. To combat network congestion, different capacity planning solutions have been suggested to address and resolve the degradation issues. However, since a wide variety of capacity planning solutions are available as options to resolve degradation issues, it is difficult to determine which solutions, if any, are the best candidates to deploy at particular locations. As a result, the process for identifying which capacity planning solutions to deploy to alleviate network congestion and/or improve capacity is more of a trial and error process. This results in inefficiencies as well as wasted costs as telecommunications service providers try (and fail) deploying sub-optimum capacity planning solutions that are not tailored to the particular location of network traffic usage and congestion.

To solve the above and other problems, the inventors have developed an optimum capacity composite gain system and related method to identify optimum capacity planning solutions to improve telecommunications network performance for a particular location ("optimum capacity solution system"). One purpose of the optimum capacity solution system is to summarize complex, multi-dimensional indicators to support decision making by wireless telecommunication service providers on changes that may be needed to infrastructure repair, modification, planning and development. The optimum capacity solution system does this by analyzing data related to capacity planning solutions deployed at specific locations (e.g., historical data), learning from this data by creating clusters, and applying classification techniques to determine optimum capacity planning solutions capable of being deployed at a new location. As a result, a telecommunications service provider is able to efficiently and economically identify targeted solutions and locations to expand capacity of cell sites and improve customer experiences.

The optimum capacity solution system uses historical data comprising capacity gain solutions and their associated gains at various locations to train a machine learning model. The trained machine learning model then, upon receiving a new location (e.g., latitude and longitude coordinates), recommends the top n (e.g., the top 3) solutions that should be deployed at the new location to improve telecommunications network performance. The machine learning model uses clustering techniques to perform the recommendations. In some implementations, the optimum capacity solution system builds/accesses a dataset comprising information of previously deployed capacity improvement solutions, such as gain, cost, location, duration, and solution type. It then performs clustering on the dataset per market for each solution to categorize solutions within an area. Then, it ranks the solutions in each cluster based on one or more of the following criterion: spectrum, duration, area (latitude/longitude), and cost. Once a customer inputs a new location (e.g., by entering latitude/longitude, clicking on a location on a map, etc.), the optimum capacity solution system finds the nearest cluster and shows the top n solutions in the cluster. (While the term "customer" is used in the application, one of skill in the art will understand that the concepts discussed herein will similarly apply to other users, who may or may not be customers of a telecommunications service provider.)

In the following description, for the purposes of explanation, numerous specific details are set forth in order to provide a thorough understanding of implementations of the present technology. It will be apparent, however, to one skilled in the art that implementations of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Suitable Computing Environments

FIG. 1 is a block diagram illustrating a suitable computing environment 100 within which to select optimum network performance improvement solutions within a telecommunications network.

One or more user devices 110, such as mobile devices or user equipment (UE) associated with users (such as mobile phones (e.g., smartphones), tablet computers, laptops, and so on), Internet of Things (IoT) devices, devices with sensors, and so on, receive and transmit data, stream content, and/or perform other communications or receive services over a telecommunications network 130, which is accessed by the user device 110 over one or more cell sites 120, 125. For example, the user device 110 can access a telecommunication network 130 via a cell site at a geographical location that includes the cell site, in order to transmit and receive data (e.g., stream or upload multimedia content) from various entities, such as a content provider 140, cloud data repository 145, and/or other user devices 155 on the network 130 and via the cell site 120.

The cell sites may include macro cell sites 120, such as base stations, small cell sites 125, such as picocells, microcells, or femtocells, and/or other network access component or sites (including IEEE 802.11 WLAN access points). The cell sites 120, 125 can store data associated with their operations, including data associated with the number and types of connected users, data associated with the provision and/or utilization of a spectrum, radio band, frequency channel, and so on, provided by the cell sites 120, 125, and so on. The cell sites 120, 125 can monitor their use, such as the provisioning or utilization of PRBs provided by a cell site physical layer in LTE network. For example, a cell site 120 having a channel bandwidth of 5 MHz that provides 25 available physical resource blocks through which data can be transmitted to/from the user device 110.

Other components provided by the telecommunications network 130 can monitor and/or measure the operations and transmission characteristics of the cell sites 120, 125 and other network access components. For example, the telecommunications network 130 can provide a network monitoring system, via a network resource controller (NRC) or network performance and monitoring controller, or other network control component, in order to measure and/or obtain the data associated with the utilization of cell sites 120, 125 when data is transmitted within a telecommunications network.

The computing environment 100 includes an optimum capacity solution system 150 configured to monitor aspects of the network 130 based on, for example, data received from the network monitoring system. The optimum capacity solution system 150 can evaluate and select optimum network performance improvement solutions to be deployed at cell sites to improve their performance as described in detail below.

FIG. 1 and the discussion herein provide a brief, general description of a suitable computing environment 100 in which the optimum capacity solution system 150 can be supported and implemented. Although not required, aspects of the optimum capacity solution system 150 are described in the general context of computer-executable instructions, such as routines executed by a computer, e.g., mobile device, a server computer, or personal computer. The system can be practiced with other communications, data processing, or computer system configurations, including: Internet appliances, hand-held devices (including tablet computers and/or personal digital assistants (PDAs)), Internet of Things (IoT) devices, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through any communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative implementation, the mobile device or portable device can represent the server portion, while the server can represent the client portion.

In some implementations, the user device 110 and/or the cell sites 120, 125 can include network communication components that enable the devices to communicate with remote servers or other portable electronic devices by transmitting and receiving wireless signals using a licensed, semi-licensed, or unlicensed spectrum over communications network, such as network 130. In some cases, the communication network 130 can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The telecommunications network 130 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), 5G mobile communications network, IEEE 802.11 (WiFi), or other communications networks. Thus, the user device is configured to operate and switch among multiple frequency bands for receiving and/or transmitting data.

Further details regarding the operation and implementation of the optimum capacity solution system 150 will now be described.

Examples of Identifying Optimum Network Performance Improvement Solutions

Figure 2:
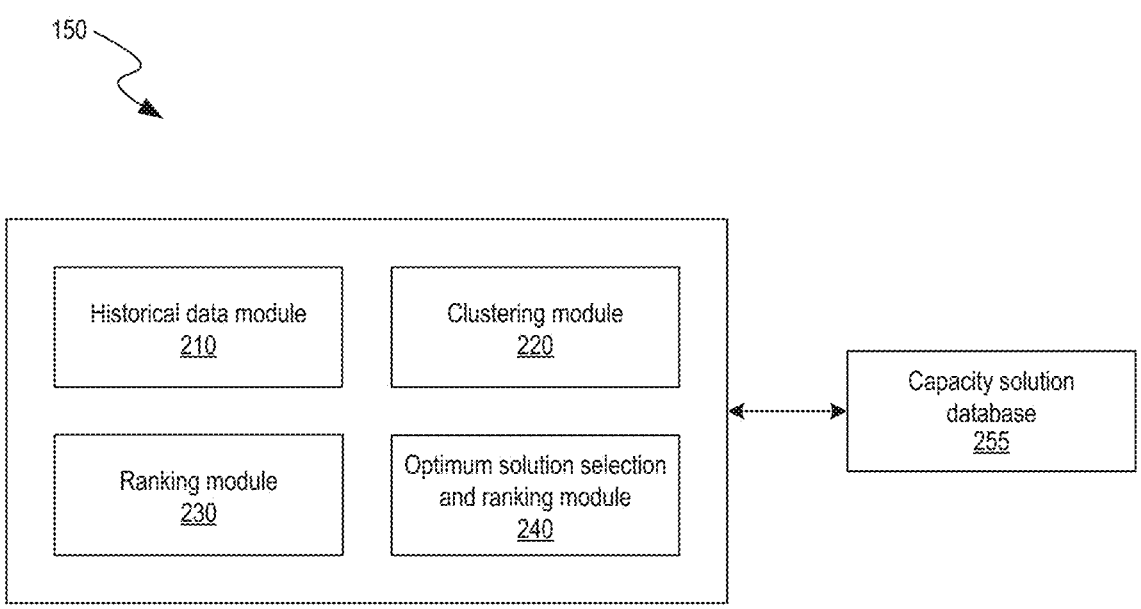
FIG. 2 is a block diagram illustrating the components of the optimum capacity solution system.
Figure 3B:
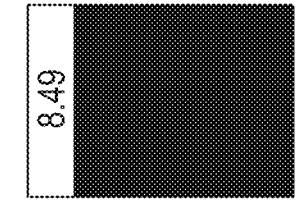
Figure 3B:
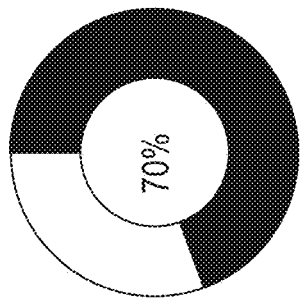
Figure 3C:
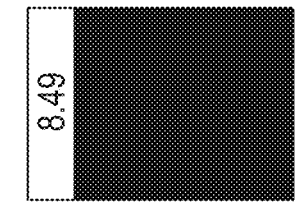
Figure 3C:
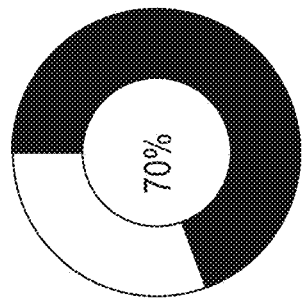
Figure 3D:
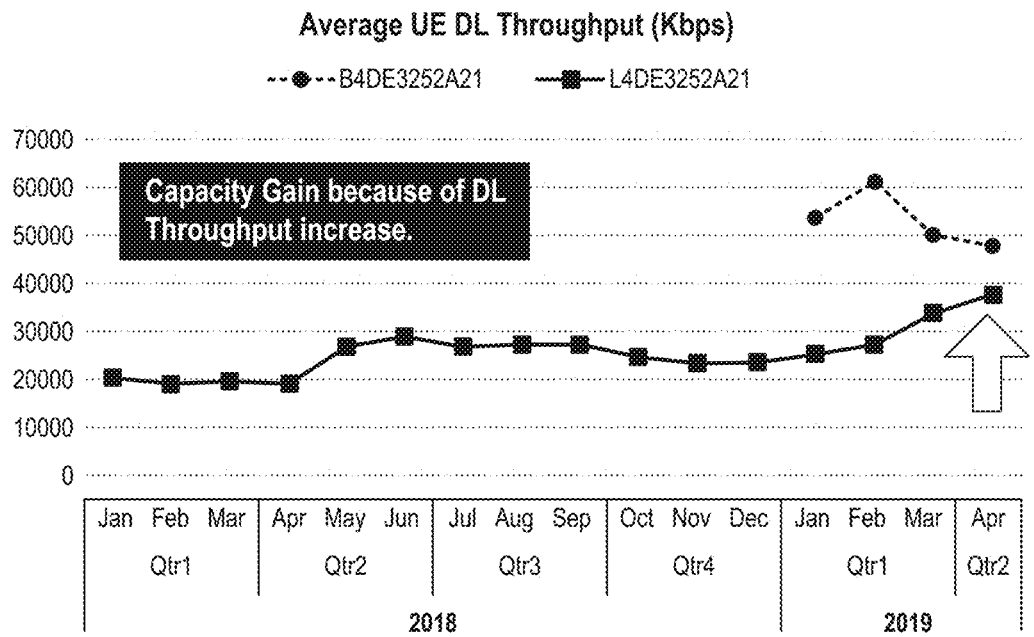
Figure 3D:
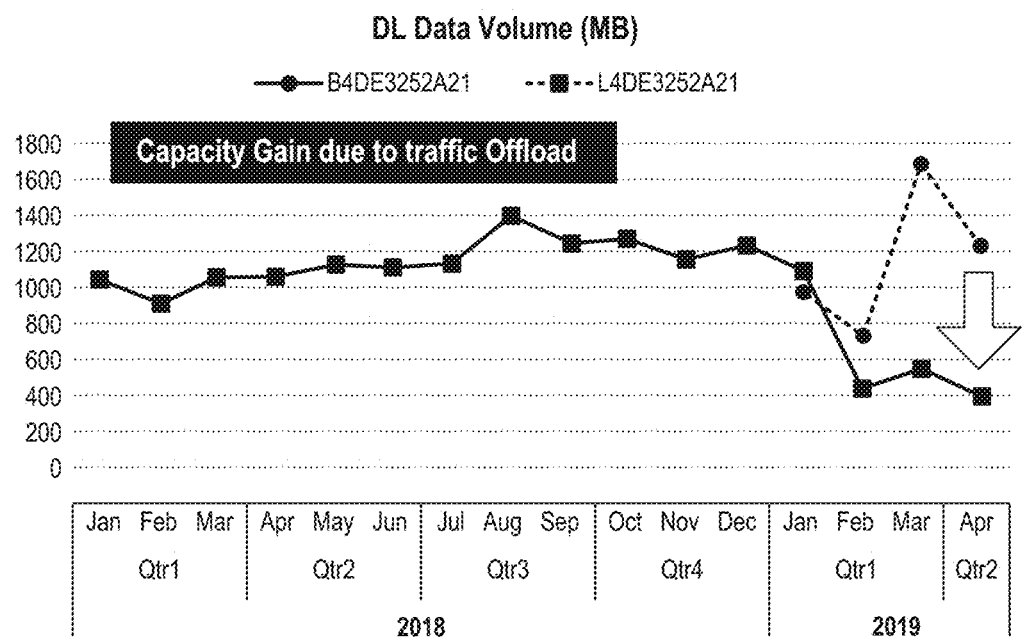
Figure 3E:
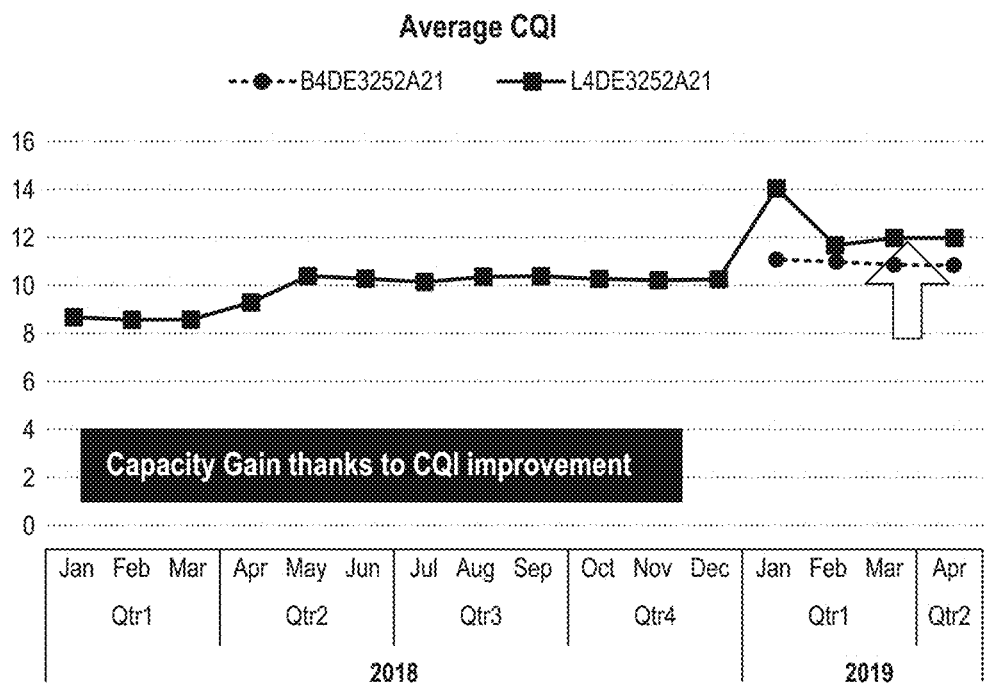
Figure 3E:
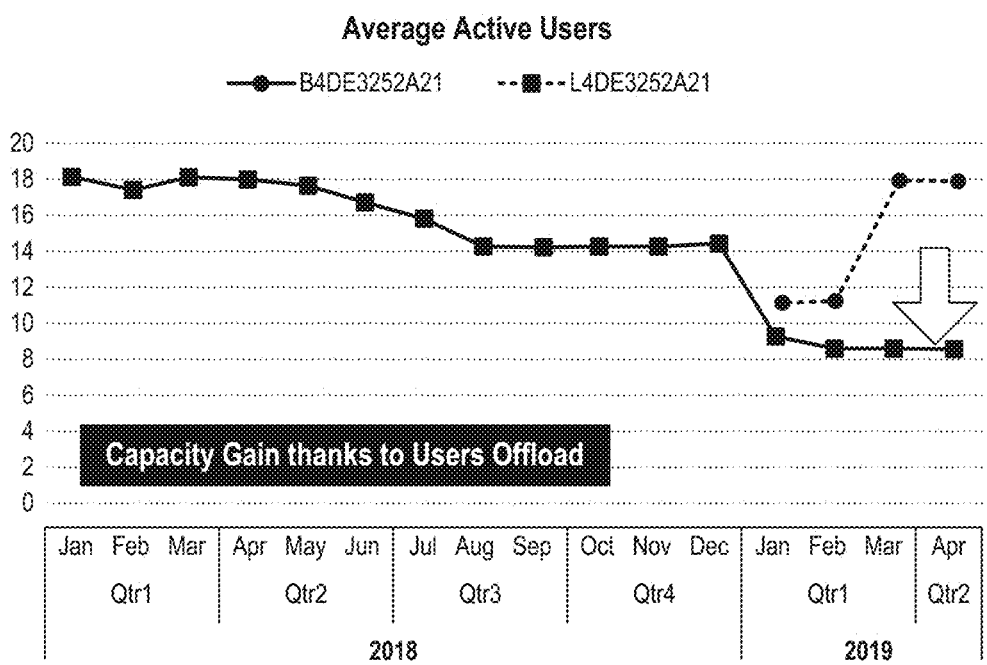
Figure 3F:
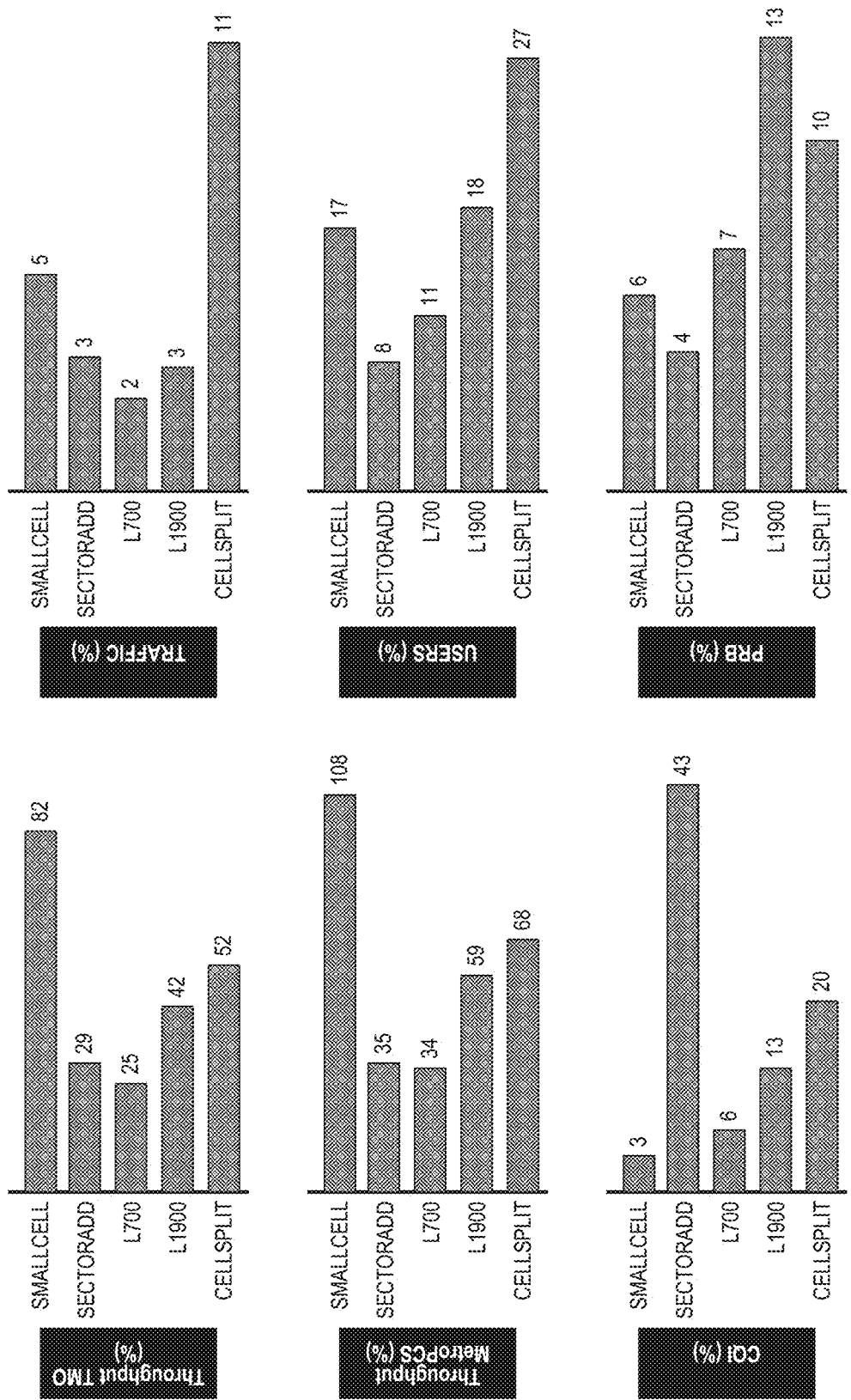

FIG. 2 is a block diagram illustrating the components of the optimum capacity solution system 150. The optimum capacity solution system 150 can include functional modules that are implemented with a combination of software (e.g., executable instructions, or computer code) and hardware (e.g., at least a memory and processor). Accordingly, as used herein, in some examples a module is a processor-implemented module or set of code, and represents a computing device having a processor that is at least temporarily configured and/or programmed by executable instructions stored in memory to perform one or more of the specific functions described herein. For example, the optimum capacity solution system 150 can include a historical data module 210, a clustering module 220, a ranking module 230, and an optimum solution selection module 240, each of which is discussed separately below.

Historical Data Module

The historical data module 210 is configured and/or programmed to generate/access/receive/collect a set of network improvement solutions records for one or more locations over a period of time (e.g., daily, weekly, monthly, quarterly, yearly, etc.) (which can be stored in the capacity solution database 255). The set of network improvement solutions records comprises information about one or more of the following parameters: location (e.g., latitude/longitude), market(s) associated with the location, network performance improvement solution(s) deployed at the location, and an associated gain profile for the deployed network performance improvement solutions. Additionally or alternatively, the set of network improvement solutions records comprises information about one or more of the following solutions metrics associated with the deployed network performance improvement solutions: gain index, gain measures, time to deploy solution, lead time to deploy solution, cost to deploy solution, cost to maintain solution, total cost of solution, expected lifetime of solution, average median income, user demographics (e.g., age, income, crime statistics, occupation, education level, ethnicity, and so on), duration of gain to customers, change in customers after deploying solution, change in revenue after deploying solution, change in sales after deploying solution, traffic, number of users, Physical Resource Block (PRB) utilization, Channel Quality Indicator (CQI), throughput, carrier aggregation, advanced Quadrature Amplitude Modulation (QAM), duration of deploying the network performance improvement solution, lifetime of the network performance improvement solution, efficacy of the network performance improvement solution, location of the telecommunications network site, lease information of the telecommunications network site, duration of deployment of the network performance improvement solution, entitlements and permits required to deploy the network performance improvement solution, tower height, nearest available site, population served by the telecommunications network site, households served by the telecommunications network site, rent cost associated with the network performance improvement solution, backhaul availability, and so on. The term market is used to denote a geographic area, such as a portion (or all) of a city, town, state, country, other similar geographic construct (e.g., Pacific Northwest, Southeast, etc.), and so on. Each market can be associated with a group of locations (e.g., latitude/longitude pairs).

U.S. Pat. No. 10,555,191, the contents of which are incorporated herein in its entirety, describes methods and systems for computing gain metric values (gain measures) for network improvement solutions deployed at a location. In some implementations, the historical data module 210 collects capacity gain measure values for a set of key performance indicators (KPIs) for both before and after deployment of network improvement solutions at locations. Examples of KPIs include, but are not limited to traffic, number of users, PRB utilization, CQI, and throughput. For example, the historical data module 210 collects three years of capacity gain measure values for the selected KPIs as well as three years of each solution's lead time, cost for each market, and location. FIGS. 3A-3F are example of data generated/accessed/received/collected by the historical data module 210.

Clustering Module

Figure 4B:
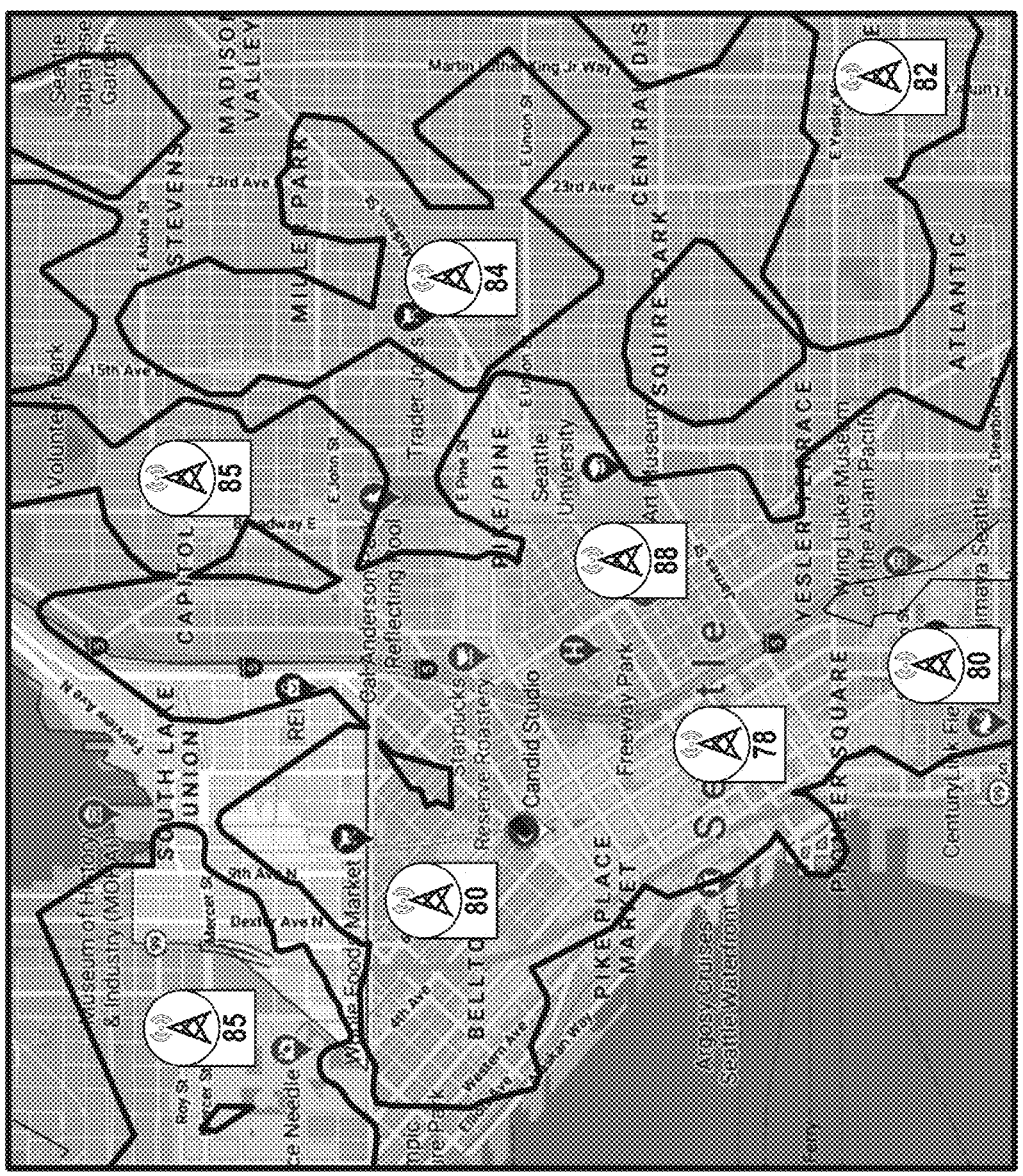

The clustering module 220 is configured and/or programmed to generate market clusters for each solution to categorize solutions based on one or more solutions metrics. In some implementations, the clustering module 220 selects, for a market, a set of sites to consider for performing the clustering analysis. For example, the clustering module 220 selects the sites whose locations fall within the geographic boundaries of the market (e.g., North Seattle, Midtown New York City, Florida, etc.). Additionally, or alternatively, the clustering module 220 can compute a score/priority for sites in the market using weights based on one or more of the following parameters: traffic, unique users, count of superphones (e.g., phone with certain characteristics such as release dates), revenue, throughput, duration of congestion, cost of lease/rent, median income, average household income, location of site, cost of hardware installed, age demographic distribution, and so on. The parameter values can be of different time granularities, such as weekly, monthly, quarterly, one time, and so on. FIGS. 4A and 4B illustrate scores generated for various sites in markets. The site scores can be used to rank the sites in the market, and the clustering module 220 can select the top n ranked sites when performing the clustering analysis discussed below. In some implementations, the clustering module 220 can score and rank sites in different markets using different parameter sets.

After identifying the set of sites to consider for the clustering analysis, the clustering module 220 generates, for each market, clusters of network improvement solutions records for the market. The clustering module can use techniques, such as k-means clustering, to generate the clusters. The clusters can be generated based on a group of locations associated with the market and/or values of one or more of the solution metrics discussed above. The clustering module 220 can select a subset of the solution metrics discussed above based on solution metrics selection criteria, such as user selection, output optimization criteria (e.g., expected gain, length of solution to deploy, best solution, desired location characteristics, and so on), correlation between solution metric and efficacy of solution/gain measures, top n KPIs, and so on.

Figure 6A:
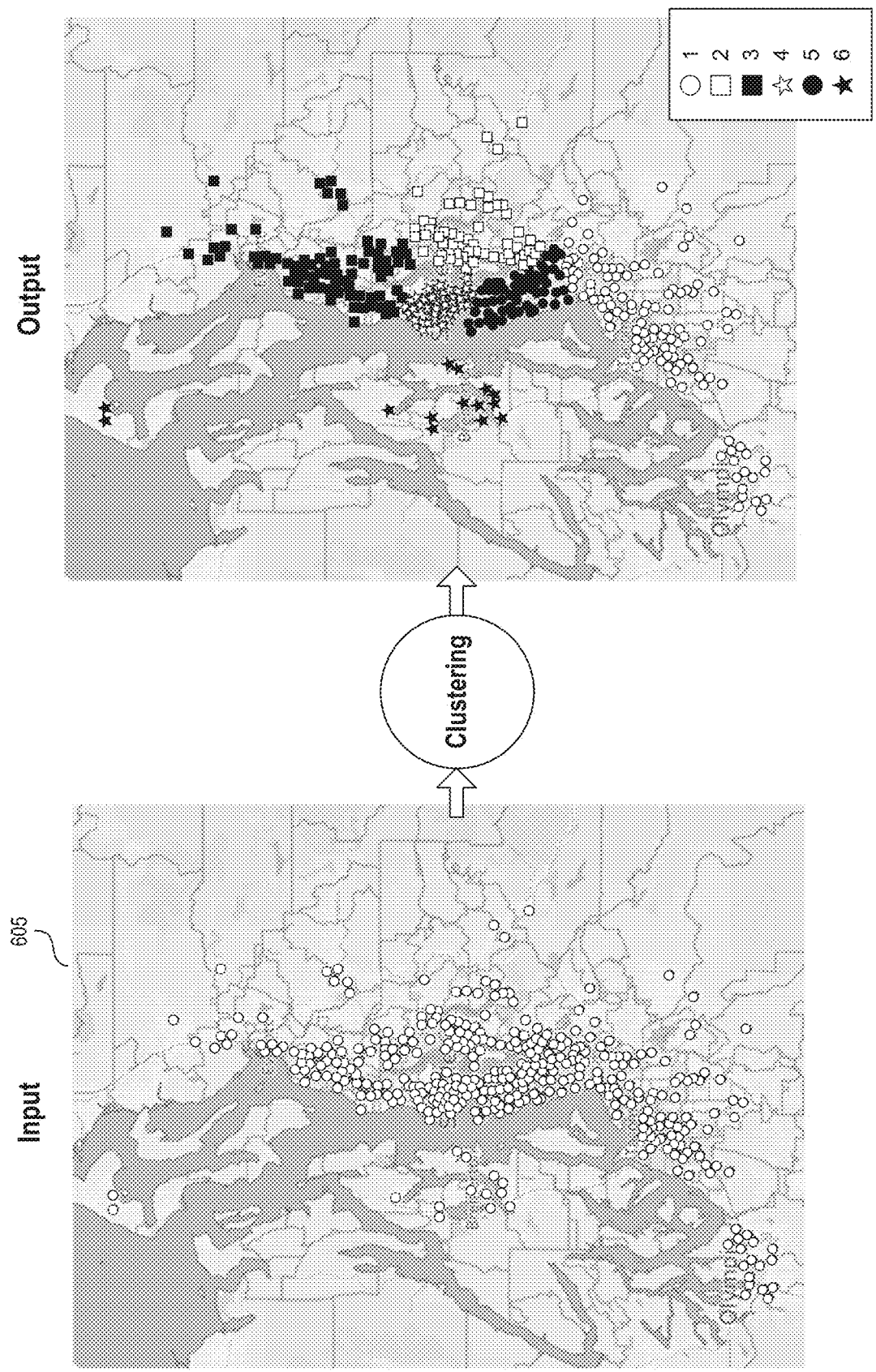

FIGS. 6A-6B illustrate examples of generating six clusters, along with several cluster attributes (e.g., gain, lead time, and best solution) for a set of network improvement solutions records associated with a geographic area 605.

Ranking Module

The ranking module 230 is configured and/or programmed to rank clusters and/or network performance improvement solutions in the generated clusters based on one or more of the following cluster ranking parameters: spectrum, duration, location, gain, cost to deploy solution, and so on. FIG. 6B illustrates a table 610 depicting a set of clusters associated with a geographic area, ranked according to their respective gains.

Optimum Solution Selection and Ranking Module

The optimum solution selection and ranking module 240 is configured and/or programmed to select and recommend one (or more) network performance improvement solutions to deploy at particular locations/sites. Examples of network performance improvement solutions include, but are not limited to adding spectrum, removing spectrum, adding a proximate cell site, removing a proximate cell site, displacing a proximate cell site, adding or enhancing at least one technology capability, cell split, small cell deployment, sector addition, sector removal, sector capacity enhancement, cell on wheels addition, cell on wheel removal, tower addition, tower removal, hot spots addition, hot spots removal, capacity modification, and so on.

The optimum solution selection and ranking module 240 receives a candidate location at which a user desires to deploy network performance improvement solution(s). For example, the optimum capacity solution system 150 can receive a user selection of a location via a user interface (e.g., a user can enter a location name, latitude/longitude, click on a location on a map, etc.). Upon receiving a desired location details, the optimum solution selection and ranking module 240 identifies a prioritized set of network performance improvement solutions capable of being deployed at the received location. The optimum solution selection and ranking module 240 identifies the prioritized set of network performance improvement solutions based on values of a set of prioritization parameters and the generated clusters. The set of prioritization parameters comprises one or more of the following: gain index, gain measures, time to deploy solution, lead time to deploy solution, cost to deploy solution, cost to maintain solution, total cost of solution, expected lifetime of solution, average median income, user demographics (e.g., age, income, crime statistics, occupation, education level, ethnicity, and so on), duration of gain to customers, change in customers after deploying solution, change in revenue after deploying solution, change in sales after deploying solution, traffic, number of users, Physical Resource Block (PRB) utilization, Channel Quality Indicator (CQI), throughput, carrier aggregation, advanced Quadrature Amplitude Modulation (QAM), duration of deploying the network performance improvement solution, lifetime of the network performance improvement solution, efficacy of the network performance improvement solution, location of the telecommunications network site, lease information of the telecommunications network site, duration of deployment of the network performance improvement solution, entitlements and permits required to deploy the network performance improvement solution, tower height, nearest available site, population served by the telecommunications network site, households served by the telecommunications network site, rent cost associated with the network performance improvement solution, backhaul availability, and so on. Alternatively or additionally, the optimum solution selection and ranking module 240 receives one or more prioritization parameters as output metrics that are to be optimized at the desired location, such as expected gain, length of solution to deploy, best solution, and so on.

To identify the prioritized set of network performance improvement solutions, the optimum solution selection and ranking module 240 identifies one or more candidate markets such that a group of locations associated with the candidate market are closest to the candidate location in light of the received prioritization parameters. Closeness between the group of locations associated with a candidate market and the candidate location can be determined based on closeness metrics, such as geographic distance, similarity between location characteristics, and so on. For example, similarity between location characteristics can be determined based on location similarity factors, such as demographics of users associated with a location, location type (e.g., urban, suburban, rural, etc.), legal regulations associated with the location, location coverage area, points of interest at the location, and so on.

As an example, the optimum capacity solution system 150 receives a candidate location selection from a user (e.g., when a user enters a latitude/longitude of a location and/or selects a desired location on a map). Upon receiving the candidate location, the optimum solution selection and ranking module 240 identifies one or more clusters based on the following characteristics: nearest site with previous solution, gains measured, time to deploy solution, cost of solution, best solution, and other measured KPIs. Then, the optimum solution selection and ranking module 240 can predict based on the ranked solutions in the identified clusters (which are based on historical data), a prioritized set of network performance improvement solutions (e.g., comprising the top n solutions in an identified cluster) and their expected gain, time to deploy solution, and so on.

Additionally or alternatively, the optimum solution selection and ranking module 240 computes a rank value for each network performance improvement solution in the prioritized set of network performance improvement solutions based on the values of the set of prioritization parameters. The optimum solution selection and ranking module 240 can then select and/or implement, at the candidate location, an optimum network performance improvement solution from the prioritized set of network performance improvement solutions based on the computed rank values.

Flow Diagrams

Figure 5A:
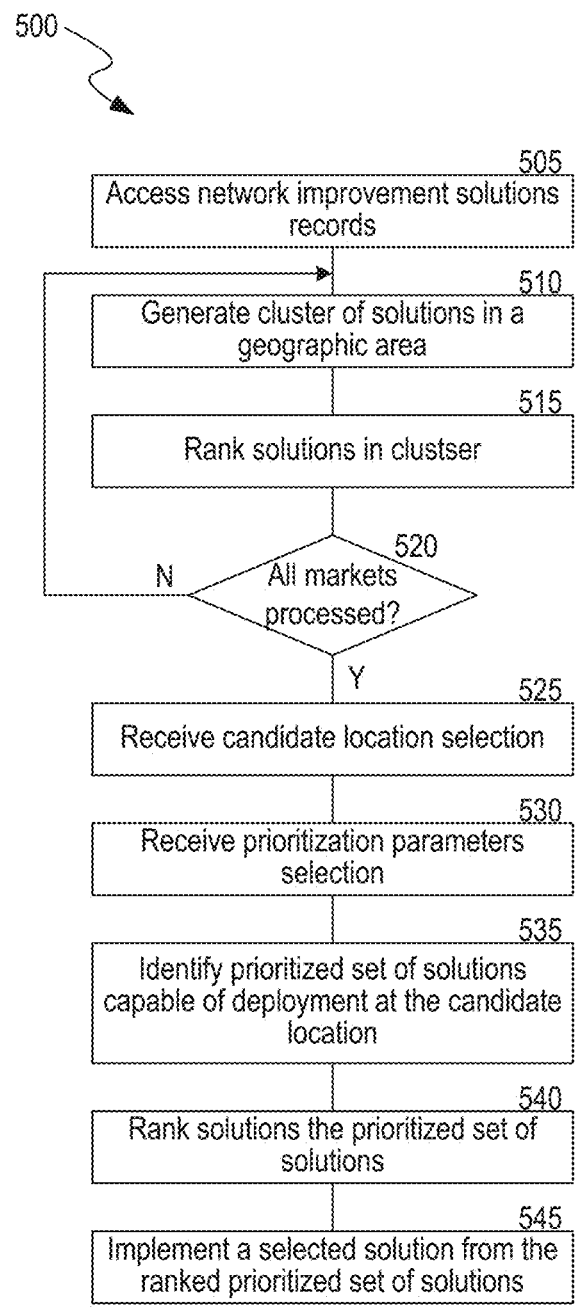
FIGS. 5A-5B are flow diagrams illustrating a process of identifying optimum network performance improvement solution at a location in a telecommunications network.

FIG. 5A is a flow diagram illustrating a process 500 of identifying optimum network performance improvement solution at a location in a telecommunications network. Process 500 begins at block 505 where it accesses a set of network improvement solutions records for multiple locations. Each record in the set of network improvement solutions records comprises information about a location, at least one network performance improvement solution deployed at the location, and an associated gain profile for the at least one network performance improvement solution. At blocks 510-520, for each market in a set of markets, wherein each market is associated with a group of locations, process 500: generates a cluster of network improvement solutions records for the market based on the group of locations associated with the market and solutions metric values associated with network performance improvement solutions deployed at each of the group of locations associated with the market (block 510); and ranks network performance improvement solutions in the cluster based on, for example, one or more of the following cluster ranking parameters: spectrum, duration, location, and cost to deploy solution (block 515). In some implementations, process 500 ranks the clusters for a market based on one or more metrics, such as gain, lead time, best solution, and so on.

At block 525, process 500 receives a candidate location to identify a prioritized set of network performance improvement solutions capable of being deployed at the candidate location. At block 530, process 500 receives a set of prioritization parameters. Using the candidate location and the set of prioritization parameters, at block 535, process 500 identifies a prioritized set of network performance improvement solutions capable of being deployed at the candidate location. At block 540, process 500 computes a rank value for each network performance improvement solution in the prioritized set of network performance improvement solutions based on, for example, the values of the set of prioritization parameters. Finally, at block 545, process 500 selects and/or implements, at the candidate location, an optimum network performance improvement solution selected from the prioritized set of network performance improvement solutions based on the computed rank values.

Figure 5B:
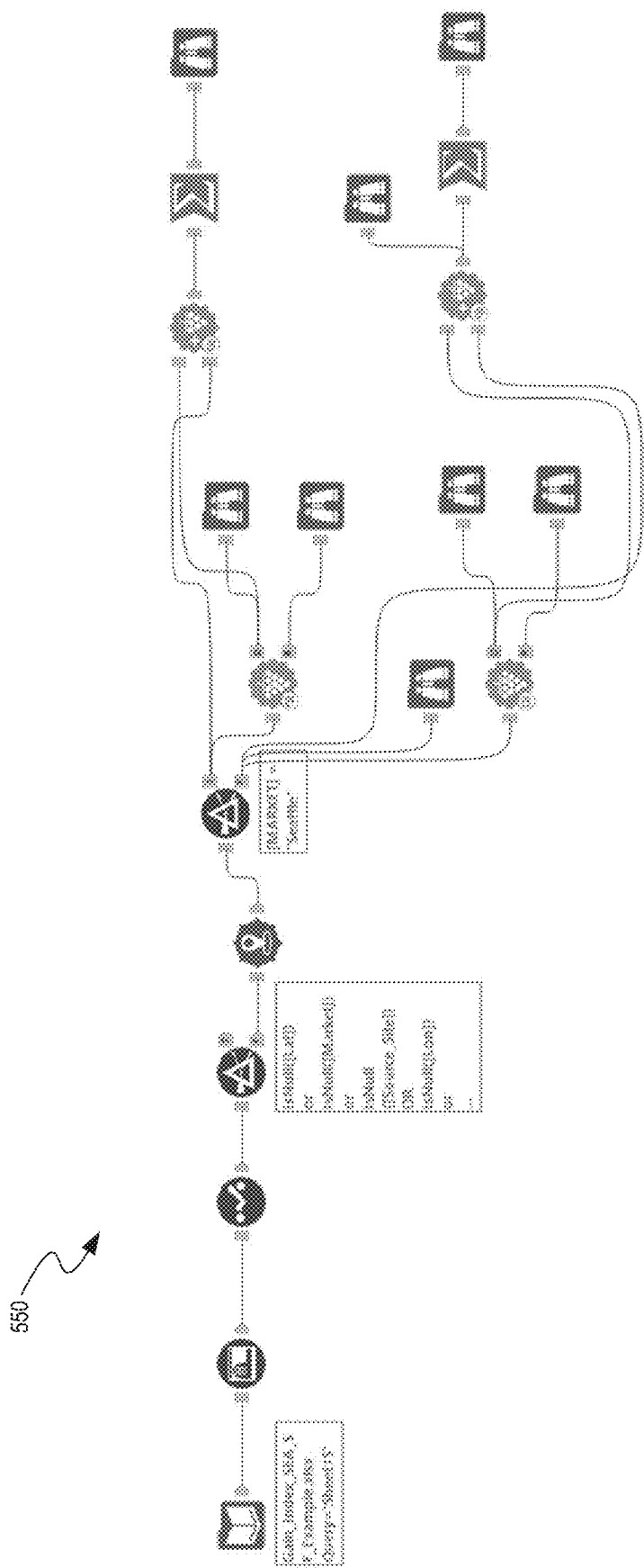

FIG. 5B is a flow diagram illustrating a process 550 of identifying optimum network performance improvement solution at a location in a telecommunications network.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations can perform routines having blocks, or employ systems having blocks, in a different order, and some processes or blocks can be deleted, moved, added, subdivided, combined, and/or modified to provide alternative or subcombinations. Each of these processes, message/data flows, or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the methods and system provided herein can be applied to other systems, not necessarily the system described above. The elements, blocks and acts of the various implementations described above can be combined to provide further implementations.

Any patents and applications and other references noted above, including any that can be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system can vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects can likewise be implemented in a computer-readable medium. Accordingly, the inventors reserve the right to add additional claims after filing the application to pursue such additional claim forms for other aspects of the technology.

The invention claimed is:

1. A computer-implemented method for identifying network performance improvement solutions to be deployed at a particular location in a telecommunications service network, the method comprising:
   accessing a set of network improvement solutions records for multiple locations,
      wherein each record in the set of network improvement solutions records comprises—
      information about a location,
         at least one network performance improvement solution deployed at the location, and
         an associated gain profile for the at least one network performance improvement solution;
   generating a cluster of network improvement solutions records for each of multiple geographic regions based on—
      a group of locations associated with a geographic region and
      solutions metric values associated with network performance improvement solutions deployed at each of the group of locations associated with the geographic region;
   ranking network performance improvement solutions in the cluster based on one or more of the following cluster ranking parameters:
      spectrum, duration, location, or cost to deploy solution;
   receiving a new location to identify a prioritized set of network performance improvement solutions capable of being deployed at the new location; and
   identifying the prioritized set of network performance improvement solutions capable of being deployed at the new location based on values of a set of prioritization parameters and the generated clusters.

2. The computer-implemented method of claim 1, wherein the solutions metric values and/or the set of prioritization parameters comprise:
   gain index,
   gain measures,
   time to deploy solution,
   lead time to deploy solution,
   duration of deployment of solution,
   entitlements and permits required to deploy solution,
   cost to deploy solution,
   cost to maintain solution,
   rent cost associated with solution,
   expected lifetime of solution,
   efficacy of solution,
   average median income,
   user demographics,
   duration of gain to customers,
   change in customers after deploying solution,
   change in revenue after deploying solution,
   change in sales after deploying solution,
   traffic,
   number of users,
   Physical Resource Block (PRB) utilization,
   Channel Quality Indicator (CQI),
   throughput,
   carrier aggregation,
   advanced Quadrature Amplitude Modulation (QAM),
   location,
   location of telecommunications network sites,
   lease information of telecommunications network sites,
   tower height,
   nearest available sites,
   population served by telecommunications network sites,
   households served by telecommunications network sites,
   backhaul availability,
   or any combination thereof.

3. The computer-implemented method of claim 1, further comprising:
   computing a rank value for each network performance improvement solution in the prioritized set of network performance improvement solutions based on the values of the set of prioritization parameters; and
   selecting, and implementing at the new location, an optimum network performance improvement solution from the prioritized set of network performance improvement solutions based on the computed rank values.

4. The computer-implemented method of claim 1, wherein the network performance improvement solutions comprises:
   adding spectrum,
   removing spectrum,
   adding a proximate cell site,
   removing a proximate cell site,
   displacing a proximate cell site,
   adding or enhancing at least one technology capability,
   cell split,
   small cell deployment,
   sector addition,
   sector removal,
   sector capacity enhancement,
   cell on wheels addition,
   cell on wheel removal,
   tower addition,
   tower removal,
   hot spots addition,
   hot spots removal,
   capacity modification,
   or any combination thereof.

5. The computer-implemented method of claim 1, wherein identifying the prioritized set of network performance improvement solutions comprises:
   identifying a candidate geographic region, wherein a group of locations associated with the candidate geographic region is closest to the received new location,
      wherein the prioritized set of network performance improvement solutions comprises a network performance improvement solution deployed at at least one of the group of locations associated with the candidate geographic region,
      wherein the closeness between the group of locations associated with the candidate geographic region and the received new location is determined based on:
         geographic distance,
         similarity between location characteristics,
         or any combination thereof; and,
      wherein the similarity between location characteristics is determined based on:
         user demographics,
         location type,
         legal regulations,
         coverage area,
         points of interest,
         or any combination thereof.

6. The computer-implemented method of claim 1, wherein identifying the prioritized set of network performance improvement solutions comprises:

identifying a candidate geographic region, wherein a group of locations associated with the candidate geographic region is closest to the received new location, wherein the prioritized set of network performance improvement solutions comprises a network performance improvement solution deployed at at least one of the group of locations associated with the candidate geographic region, and wherein the closeness between the group of locations associated with the candidate geographic region and the received new location is determined based on:
geographic distance,
similarity between location characteristics,
or any combination thereof.

7. The computer-implemented method of claim 1, wherein identifying the prioritized set of network performance improvement solutions comprises:
identifying a candidate geographic region, wherein a group of locations associated with the candidate geographic region is closest to the received new location, wherein the prioritized set of network performance improvement solutions comprises a network performance improvement solution deployed at at least one of the group of locations associated with the candidate geographic region.

8. At least one non-transitory computer-readable medium, carrying instructions, which when executed by at least one data processing platform, execute instructions to identify network improvement solutions to be deployed at a location in a telecommunications service network, the instructions comprising:
accessing a set of network improvement solutions records for multiple locations,
wherein each record in the set of network improvement solutions records comprises information about a location, at least one network performance improvement solution deployed at the location, and an associated gain profile for the at least one network performance improvement solution;
for each market in a set of markets, wherein each market is associated with a group of locations:
generating a cluster of network improvement solutions records for the market based on the group of locations associated with the market and solutions metric values associated with network performance improvement solutions deployed at each of the group of locations associated with the market;
ranking network performance improvement solutions in the cluster based on one or more of the following cluster ranking parameters:
spectrum, duration, location, and cost to deploy solution;
receiving a new location to identify a prioritized set of network performance improvement solutions capable of being deployed at the new location; and
identifying the prioritized set of network performance improvement solutions capable of being deployed at the new location based on values of a set of prioritization parameters and the generated clusters.

9. The computer-readable medium of claim 8, wherein the solutions metric values, the set of prioritization parameters, or both comprise:
gain index,
gain measures,
time to deploy solution,
lead time to deploy solution,
duration of deployment of solution,
entitlements and permits required to deploy solution,
cost to deploy solution,
cost to maintain solution,
rent cost associated with solution,
expected lifetime of solution,
efficacy of solution,
average median income,
user demographics,
duration of gain to customers,
change in customers after deploying solution,
change in revenue after deploying solution,
change in sales after deploying solution,
traffic,
number of users,
Physical Resource Block (PRB) utilization,
Channel Quality Indicator (CQI),
throughput,
carrier aggregation,
advanced Quadrature Amplitude Modulation (QAM),
location,
location of telecommunications network sites,
lease information of telecommunications network sites,
tower height,
nearest available sites,
population served by telecommunications network sites,
households served by telecommunications network sites,
backhaul availability,
or any combination thereof.

10. The computer-readable medium of claim 8, further comprising:
computing a rank value for each network performance improvement solution in the prioritized set of network performance improvement solutions based on the values of the set of prioritization parameters; and
selecting, and implementing at the new location, an optimum network performance improvement solution from the prioritized set of network performance improvement solutions based on the computed rank values.

11. The computer-readable medium of claim 8, wherein the network performance improvement solutions comprises:
adding spectrum,
removing spectrum,
adding a proximate cell site,
removing a proximate cell site,
displacing a proximate cell site,
adding or enhancing at least one technology capability,
cell split,
small cell deployment,
sector addition,
sector removal,
sector capacity enhancement,
cell on wheels addition,
cell on wheel removal,
tower addition,
tower removal,
hot spots addition,
hot spots removal,
capacity modification,
or any combination thereof.

12. The computer-readable medium of claim 8, wherein identifying the prioritized set of network performance improvement solutions comprises:
identifying a candidate market in the set of markets, wherein a group of locations associated with the candidate market are closest to the received new location, wherein the prioritized set of network performance improvement solutions comprises a network performance improvement solution deployed at at least one of the group of locations associated with the candidate market.

13. The computer-readable medium of claim 12, wherein the closeness between the group of locations associated with the candidate market and the received new location is determined based on:
   geographic distance,
   similarity between location characteristics,
   or any combination thereof.

14. The computer-readable medium of claim 13, wherein the similarity between location characteristics is determined based on:
   user demographics,
   location type,
   legal regulations,
   coverage area,
   points of interest,
   or any combination thereof.

* * * * *